United States Patent [19]

Primeau

[11] Patent Number: 5,598,724
[45] Date of Patent: Feb. 4, 1997

[54] BUTTERFLY VALVE SAFETY LOCK

[76] Inventor: Mario Primeau, 8710, rue Marjolaine, St-Léonard (Québec), Canada, H1R 2H6

[21] Appl. No.: 578,778
[22] Filed: Dec. 26, 1995
[51] Int. Cl.⁶ ..................................... F16K 35/06
[52] U.S. Cl. ................ 70/177; 70/180; 70/203; 137/385
[58] Field of Search ............................. 70/175–180, 203, 70/212; 137/385

[56] References Cited

U.S. PATENT DOCUMENTS

| | | | |
|---|---|---|---|
| 1,245,770 | 11/1917 | Rideout | 70/176 |
| 5,052,939 | 10/1991 | Koch | 439/133 |
| 5,165,263 | 11/1992 | Perron et al. | 70/180 X |
| 5,222,382 | 6/1993 | De Vizzi | 70/180 X |
| 5,299,597 | 4/1994 | Fort et al. | 137/385 |

*Primary Examiner*—Lloyd A. Gall
*Attorney, Agent, or Firm*—Francois Martineau

[57] ABSTRACT

A safety lock device for use in releasably locking the head of a butterfly valve. The two part safety lock device comprises first: a cross-sectionally U-shape elongated frame, having an anchoring part at one end and a lateral flange with a number of bores; the anchoring part releasably engages with the valve head for anchoring the U-frame to the valve head; the elongated channel is sized for full engagement by the valve handle; and second: a casing, with an inner passageway, sized for through engagement by the U-frame, and a lateral pocket extension with a number of bores, for engagement by the lateral flange. The casing is characterized by a wedge part, integrally depending therefrom and sized for engagement between the diverging distal end portions of the valve handle and lever. Padlocks releasably interlock the U-frame to the casing by engaging selected pairs of flange bores and pocket bores, thereby concurrently locking the valve lever in its divergent relation to the valve handle.

8 Claims, 6 Drawing Sheets

BUTTERFLY VALVE SAFETY LOCK

FIELD OF THE INVENTION

This invention relates to locking clamps having two arms that can be closed and locked in closed condition by more than one padlock.

CROSS-REFERENCE DATA

U.S. Pat. No. 5,165,263 issued 24 Nov. 1992 to Claude PERRON and to the present inventor, is being herewith incorporated by way of reference to the present patent application.

BACKGROUND OF THE INVENTION

It is recognized that accidents occurring in industrial environments are often a consequence of carelessness. Simple, low cost precautionary measures can sometimes make a big difference in industrial accident occurrence rate. One such known safety measure consists in providing a locking member having at least a few padlock shackle engaging bore means, wherein the keys for the various padlocks are to be held by a number of different persons. For example, in the case of a fluid line controlled by a valve, having more than one padlock to lock the butterfly valve is desirable, since more than one person would need to authorize such unlocking, and any of these persons could put his veto on the unlocking of the locking device, a desirable safety feature.

One such example of multi-padlock safety lock member is disclosed in U.S. Pat. No. 5,052,939 issued on Oct. 1, 1991 to William KOCH. One drawback of these known safety locks is that, once all the padlocks are disengaged from the safety lock ears, the two arms constituting the safety lock will tend to freely open up, which could undesirably lead to the accidental release of the safety lock from the control box. It is understood that with these safety locks, the idea is not really to deter a person having a criminal intention, but more so to prevent accidents provoked mainly by carelessness.

In U.S. Pat. No. 5,165,263 issued 24 Nov. 1992 to Claude PERRON and to the present inventor, there is disclosed a locking device for locking a single control lever of the valve mounted transversely of a fluid line. This two part locking device includes a male member and a female member. The male member includes a U-shape part, engaging the outer wall of the fluid line, and a transverse channel part, extending away from the fluid line and engaging the valve handle and having a flange with a number of lengthwisely spaced bores. The female member includes a casing, with a through passage sized for through engagement by the channel part, and with a transverse pocket extension with a number of lengthwisely spaced bores, the female member extension forming a lateral pocket for through engagement by the channel part flange. More than one padlock interlock selected pairs of bores from the male member flange and from the female member pocket, to provide multiple interlock between two parts of the lock device, so as to prevent unauthorized actuation of the valve control lever.

Valve assemblies that control fluid flow in a fluid conduit may be of various designs. Usually, each such valve assembly includes at least the three following elements:

(a) a valve flap, located inside the fluid conduit and having a shape complementary to that of the internal diameter of the fluid conduit, so that, upon extending transversely of the fluid conduit, fluid flow is completely stopped;

(b) a valve-operating shaft, integrally carried by the valve flap and radially outwardly projecting from the fluid conduit, wherein rotation of the shaft tilts the valve flap between a closed limit condition, transverse to the fluid conduit, and a fully opened limit condition, coaxial to the fluid conduit; the radially outward portion of the shaft being generally shielded by a tubular radial extension, integral to the fluid line; and (c) an elongated control handle, transversely carried by the radially outer end of the valve-operating shaft.

A butterfly valve is a special type of fluid flow control valve, which includes the two following additional elements:

(a) an elbowed lever, pivoted at its intermediate elbowed section to an intermediate section of the elongated control handle, for pivotal motion about the same plane as the control handle; a coil spring generally biasing the distal end portions of the elbowed lever and control handle, away from one another; and the proximate end of the elbowed lever forming a pointed tip; and (b) a discoid plate, transversely anchored to the tubular radial shield extension surrounding the valve rotating shaft, and having a notched sector shape portion beneath the control handle, a selected notch being engaged by the pivotal elbowed lever under bias from the coil spring.

In these butterfly valves, the control handle can be pivoted, to tilt the valve flap inside the fluid conduit, only after release of the elbowed lever proximate tip from the discoid plate notch, such lever release occurring by manually grasping the lever distal end portion to draw same toward the control handle distal end portion, against the bias of the coil spring.

None of the existing art of valve locking devices specifically deals with butterfly valves.

OBJECTS OF THE INVENTION

The gist of the present invention is therefore to adapt to butterfly valve outer heads the male-female locking device disclosed in U.S. Pat. No. 5,165,263, supra.

A general object of the present invention is to provide a safety lock having two relatively movable arms, which will releasably remain in their closed position even though all the padlocks are removed.

SUMMARY OF THE INVENTION

According to the objects of the invention, there is disclosed a safety lock device for use in releasably locking the head of a butterfly valve in a fluid flow conduit, this valve head of the type having a radial shaft freely rotatable into a fixed radial tubular extension, a notched discoid plate supported by the fixed tubular extension, a handle transversely carried by the rotatable shaft with an elbowed lever intermediately pivoted to the handle, the lever and handle having distal end portions being divergent in an operative lever condition; said safety lock device comprising:

(a) an elongated male member, having an elongated channel part at one end and a hooking part at the opposite end, said hooking part for releasable hooking engagement with the valve head notched discoid plate for slidingly mounting said male member to the valve head, said elongated channel part being sized for full engagement by the valve handle;

(b) a female member, having a casing part with a mouth, sized for through engagement by said channel part, and a wedge part, integrally depending from said casing part and sized for frictional engagement between the diverging distal end portions of the valve handle and lever; and (c) locking means, for releasably interlocking said male and female members when said male member channel part is engaged into said female member casing part, and for concurrently locking the valve lever in its divergent condition relative to the valve handle.

Preferably, said locking means includes means preventing a single operator from singlehandedly unlocking same. These locking means could more particularly include:

(a) an elongated flange, transversely carried by said channel part, said flange having at least one bore;

(b) a casing extension, transversely depending from said casing part and defining an open pocket, sized for engagement by said flange, and at least one bore complementary to said at least one flange bore; and (c) at least one padlock member, having a shackle releasably engaging a selected pair of one of said flange bores and of one of said pocket bores. In such a case, it would be envisioned that each of said casing extension and of said channel flange includes at least a few said bores, and further including additional padlock members, engaging additional selected pairs of said flange bores and pocket bores, wherein a multiple padlock safety lock system is obtained.

Advantageously, first and second complementary shoulders would be envisioned, integrally carried by said channel part and by said casing, respectively, for facilitating separate handling of said male and female members.

Preferably, said channel part is cross-sectionally U-shape.

The invention also relates to a locking device for use with an elongated butterfly valve assembly of the type being mounted radially of a fluid flow conduit, the valve assembly including a transverse control handle for pivotal rotation between a first position, parallel to and in register with the conduit, and a second position, transverse to the conduit; this valve assembly further having an elbowed lever, being pivoted to the control handle at intermediate portions thereof, and a notched plate, wherein a proximate end tip of the elbowed lever is engageable into a selected notch of the notched plate and wherein a distal end part of the elbowed lever is manually actuatable to release the lever distal end part from the selected notched plate notch; wherein said locking device consists of:

(a) a male member, defining an elongated main body for releasably engaging over a substantial portion of said control handle lengthwisely thereof;

(b) a female member, defining an elongated pocket member, said pocket member having a mouth at one end, the releasably interengaged said male member and said control handle to be releasably engaged through said mouth into said pocket member for interlocking said male member and said handle, wherein said handle becomes generally concealed by said male and female members;

(c) means for preventing relative movement of said male member about said conduit;

(d) means for releasably anchoring said male and female members exclusively of said handle lever; and (e) a wedge member, integrally carried by said pocket member, for wedging engagement between the control handle and pivotal lever in relatively divergent conditions thereof to prevent pivotal displacement of said pivotal lever toward said control handle; wherein said locking device prevents pivotal rotation of said handle lever when the latter is positioned in either one of said first or second positions.

In this case, the anchoring means could include:

a flange, edgewisely depending from said male member and defining a number of lengthwisely spaced first bores;

a cross-sectionally U-shape rail, integrally dependent from one side edge of said female member and slidingly engaged by said flange, and defining a number of lengthwise spaced second bores; and at least two padlocks, each having a shackle releasably engaging a registering pair of said first bore and second bore for multiple interlock between said flange and said rail.

DETAILED DESCRIPTION OF THE INVENTION

Figure 1:
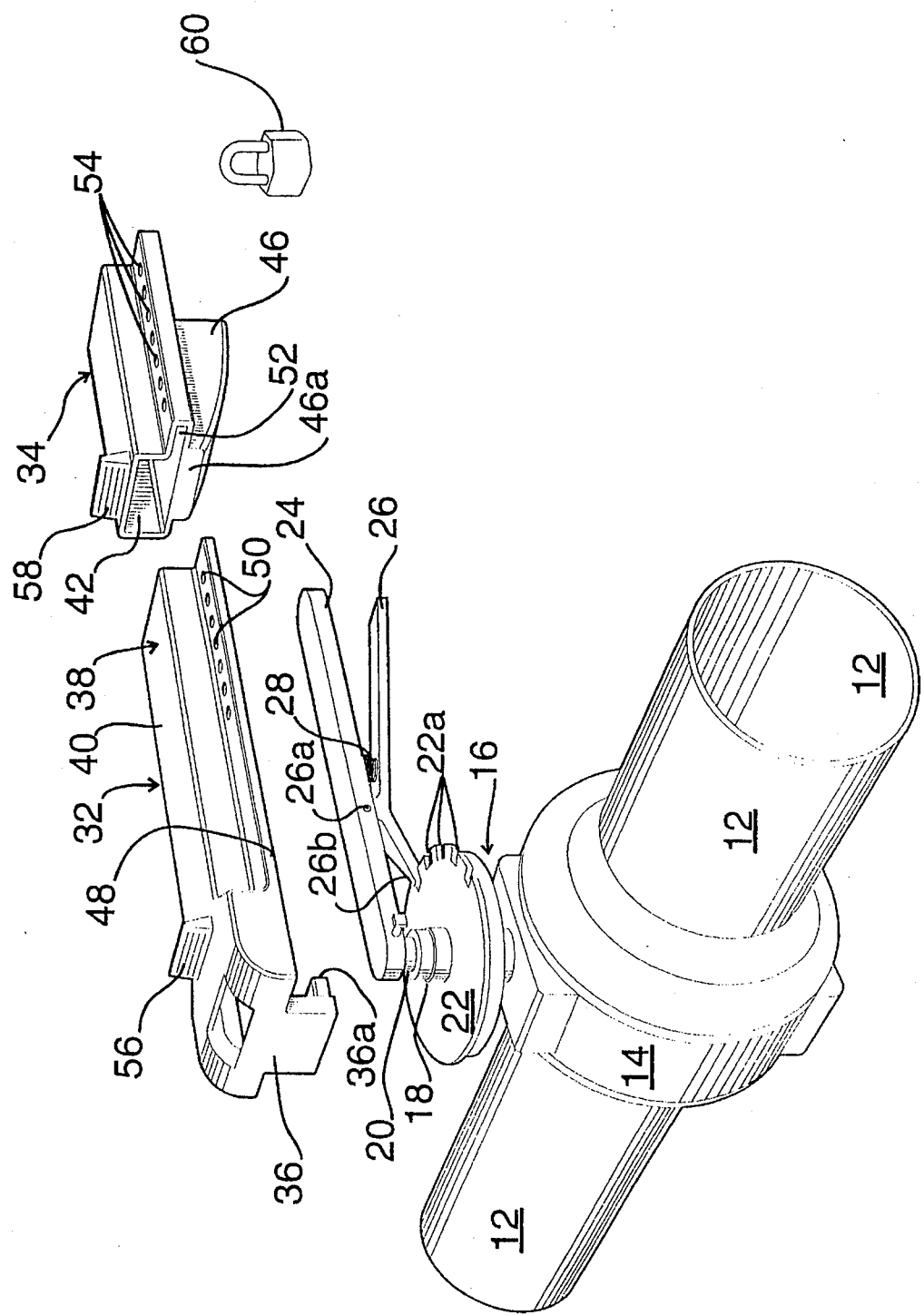
FIG. 1 is an isometric view of a fluid line, with the intermediate enlarged section thereof transversely carrying a butterfly valve head, the two components of a preferred embodiment of butterfly valve multi-padlock locking device according to the invention being shown separated and in spaced overlying condition relative to the butterfly valve head.
Figure 3:
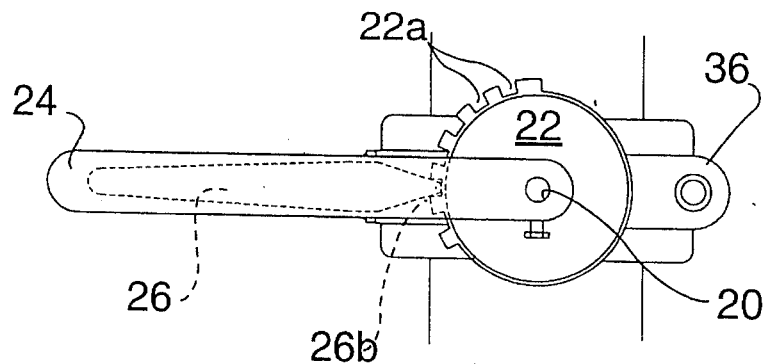
FIG. 3 is a top plan view of the elements of FIG. 2.

In FIG. 1, cylindrical fluid flow conduit 12 carries an intermediate annular enlargement 14 forming the casing of a butterfly valve assembly, 16. Valve assembly 16 includes a fixed hollow tube 18, and a valve shaft 20 rotatably mounted into the fixed tube 18, the tube 18 and shaft 20 radially outwardly projecting from casing 14. The rotatable shaft 20 conventionally carries integrally at its (hidden) radially inward end portion a valve flap (not shown), located inside the fluid flow conduit. This valve flap has a shape complementary to that of the internal diameter of the fluid flow conduit, so that the valve flap will tilt responsively to the shaft rotation between a closed condition, extending transversely to the conduit and engaging the conduit inner wall section in fluid-tight fashion, and an open condition, extending axially of the conduit.

Tube 18 transversely carries a fixed discoid panel 22, extending tangentially spacedly from the casing 14. Panel 22 includes a number of notches 22a, for example ten notches 22a, about a sector portion of its peripheral edge. As will be explained hereinbelow, the whole notched arrangement 22a, 22a, . . . should make about a quarter of a turn, to reflect the various intermediate positions between a fully opened and fully closed valve position (which are conventionally at right angle to one another).

Figure 2:
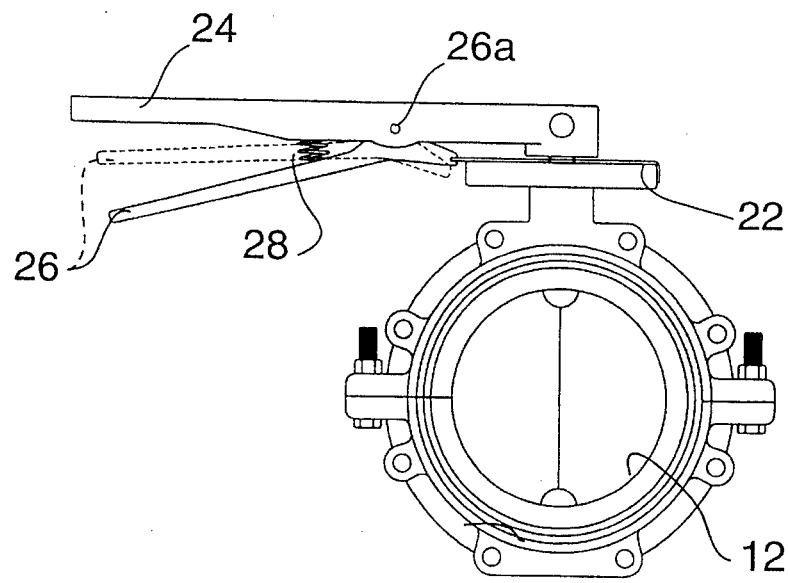
FIG. 2 is an end view of the fluid pipe of FIG. 1, without the present locking device, and suggesting in phantom lines the play of the valve lever relative to the valve handle.
Figure 4:
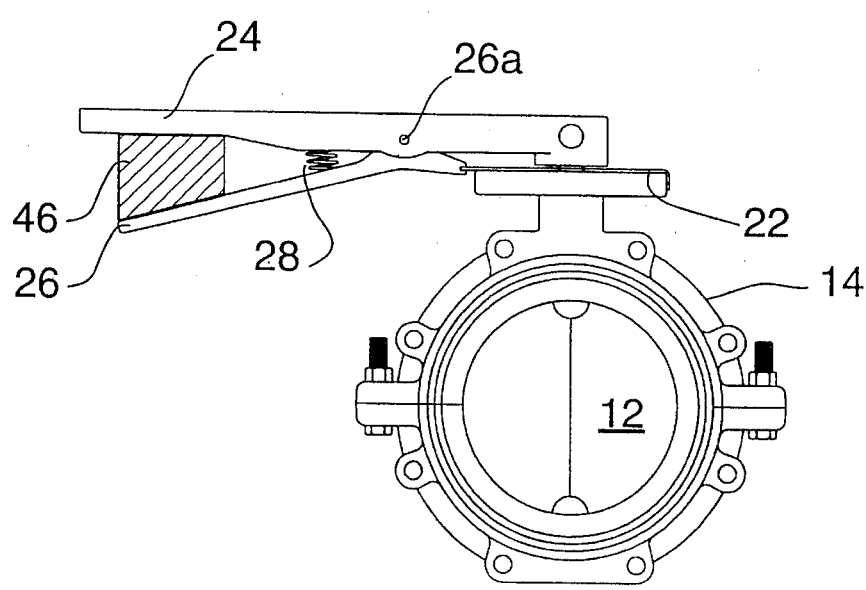
FIG. 4 is a view similar to FIG. 2, but schematically showing a separate wedge member, similar to the one in the present locking device, maintaining the lever and handle in their relatively diverging condition.

The standard elongated butterfly valve handle 24 is fixedly transversely mounted at one end to the free end of the rotatable valve shaft 20. An elbowed lever 26 is pivotally mounted at its intermediate elbowed section 26a to the intermediate section of valve handle 24, for pivotal motion within the same plane as that of the handle 24. The length of lever 26 is such that the bevelled inner end tip 26b thereof is engageable into a selected one of the notches 22a of the fixed discoid plate 22. A coil spring 28, carried by the lever 26 and extending between and engaging the distal portions of lever 26 and handle 24, biases the distal end portion of lever 26 downwardly. Thus, coil spring 28 indirectly biases proximate lever tip 26b upwardly against discoid plate 22 and into a selected notch 22a. As suggested in FIG. 2, by manually grasping lever 26 to pivotally bring same toward handle 24, against the bias of coil spring 28, lever tip 26b is concurrently displaced downwardly, beneath the plane of discoid notched plate 22, thereby releasing the discoid plate notch 22a.

Fluid pipe 12 is envisioned to be of the type used in chemical processing plants, power plants, refineries, shipbuilding, pulp and paper mills, and other applications—including heating, ventilating and air conditioning applications—where positive fluid shut-off by the butterfly valve is required for liquids, gases and slurries.

According to the invention, and as illustrated in particular in FIGS. 1 and 5–8, there is provided a two component butterfly valve safety lock, 30, defining interengageable male and female members 32, 34. Elongated male member 32 includes an inner arcuate end part 36, releasably engageable around an un-notched sector portion of discoid plate 22, and an outer end part 38 having a lengthwise U-channel 40 for receiving and accommodating therein the full length of handle 24. Female member 34 includes a casing 42 having opposite end mouths 44a, 44b, opening into a through passageway 44. Passageway 44 is sized for sliding throughengagement by the combination of male member outer part 38 and associated lever 24 engaged into the U-channel 40 thereof.

Moreover, female member 34 also includes an integral wedge block 46, extending beneath passageway 44 with the wedge block tapered (thinner) end 46a being adjacent mouth 44b. Wedge block 46 is adapted to extend between and to frictionally engage the diverging lever 26 and distal end portion of handle 24, when passageway 44 is engaged through casing mouth 44b by the combined male member outer part 38 and associated lever 24 engaged into U-channel 40. Wedge block 46 may for example be hollow, as shown.

Figure 5:
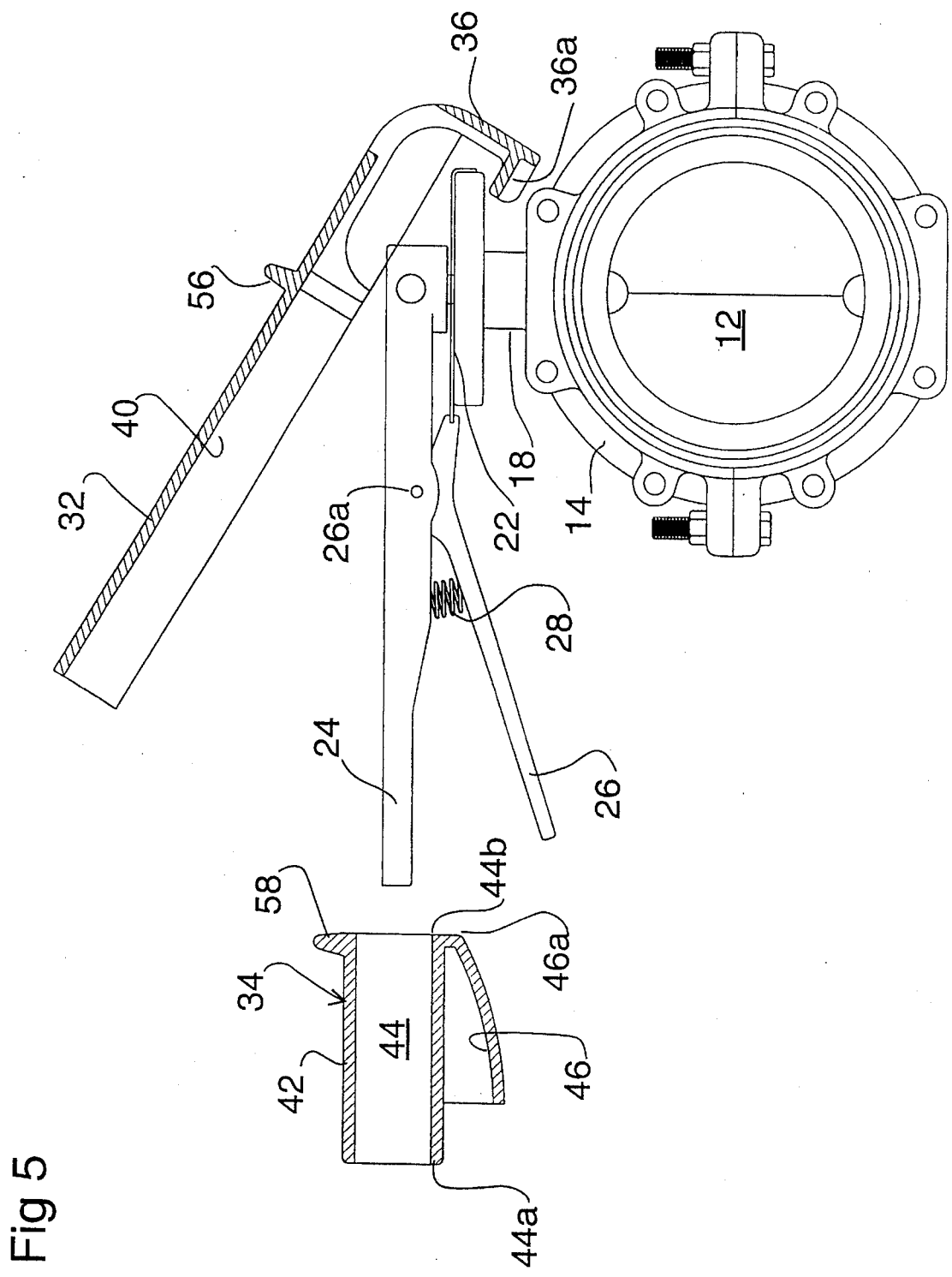
FIGS. 5, 6 and 7 are end views of the fluid flow conduit of FIG. 1, sequentially showing how the two separate components of the present locking device—shown in sectional view—can be operatively mounted to the butterfly valve head.
Figure 6:
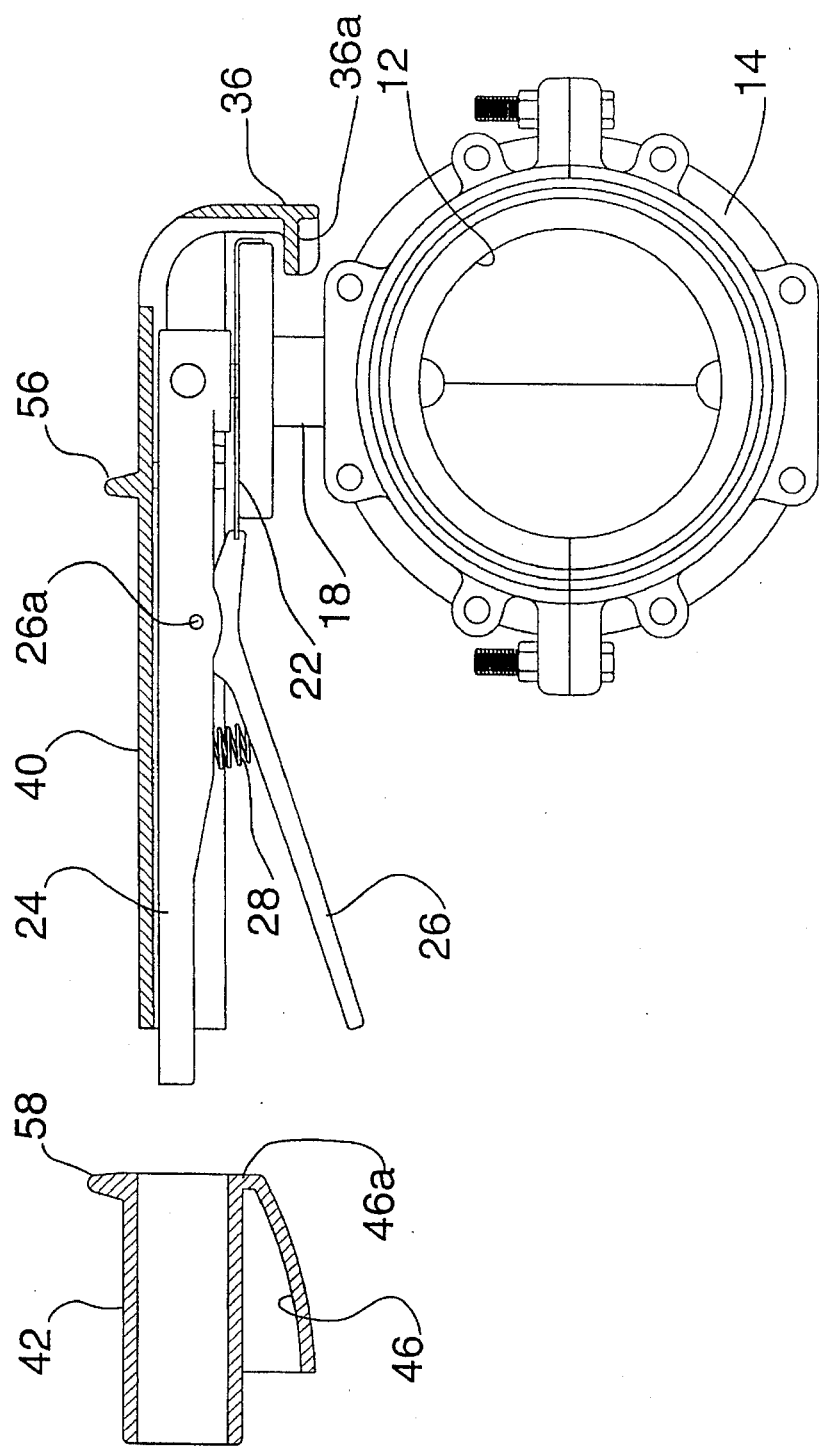
Figure 7:
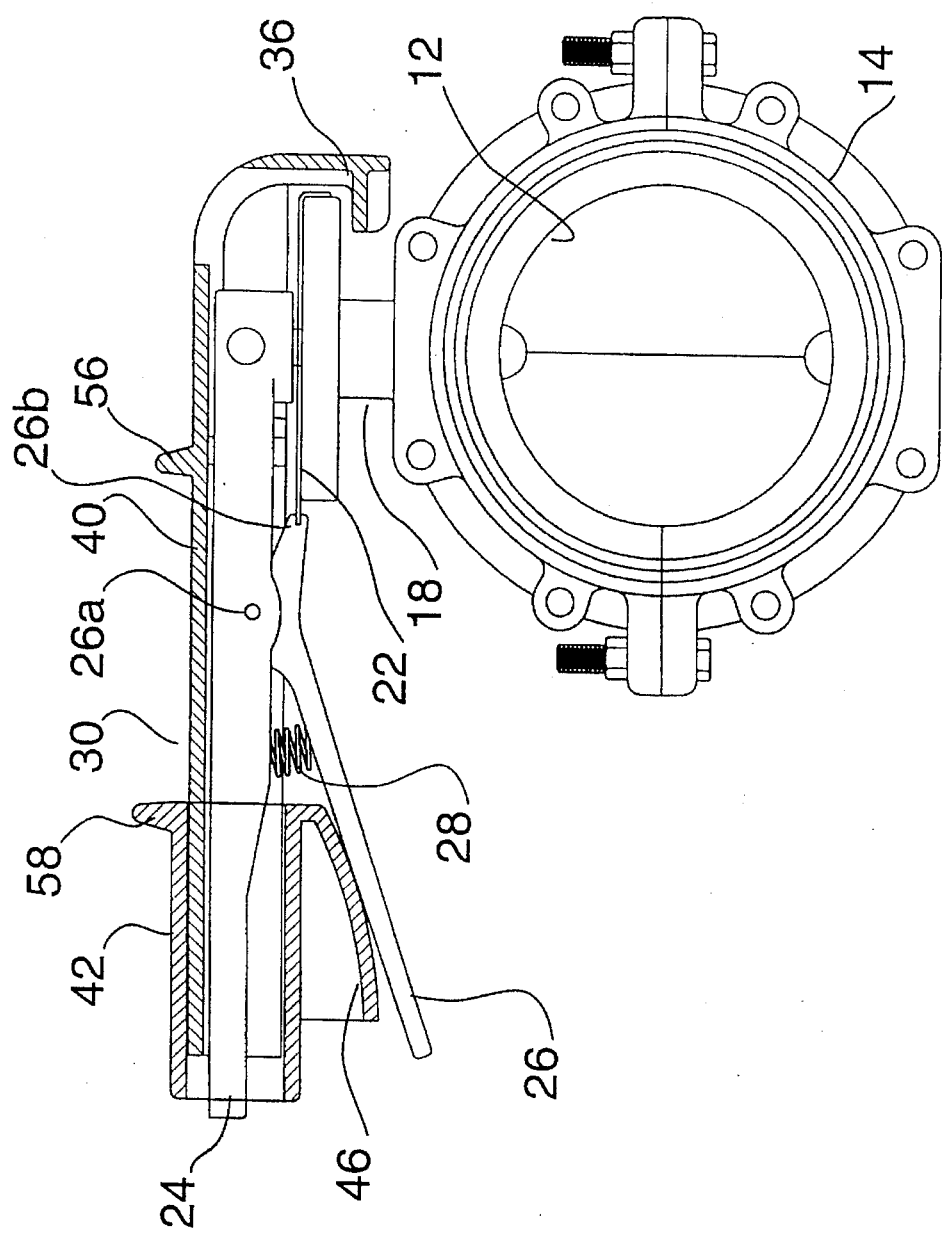

As suggested in FIGS. 5 and 6, the inner end part 36 of male member 32 forms an arcuate extension of rail 40, and includes an inturned end lip 36a. Lip 36a is destined to frictionally—yet slidingly—engage the front underside (unnotched) portion of discoid plate 22, upon the male member inner end part 36 being brought ahead of control handle 24. As the male member channel 40 is tilted downwardly against the control handle 24, the front end of control handle 24 abuts against the top end of radial pivot axle 20, the arcuate channel end 36 fits against the discoid panel 22, and the lip 36a frictionally slidingly abuts against the front underside of discoid plate 22. Such lip mounting of the male member 32 to the valve head discoid plate 22 provides hooking action therebetween, without preventing sliding relative rotation of male member 32 (concurrently with rotatable handle 24) relative to fixed discoid plate 22.

Figure 9:
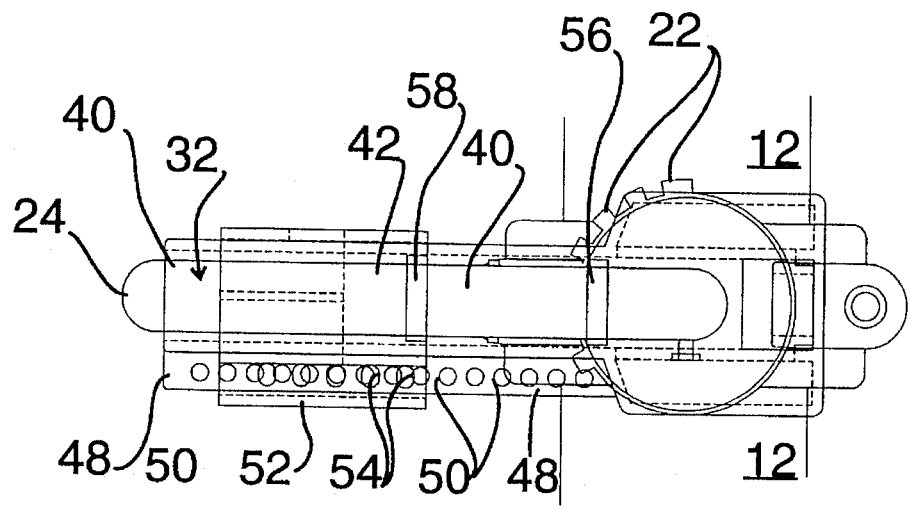
FIG. 9 is a top plan view of the elements of FIG. 8.
Figure 8:
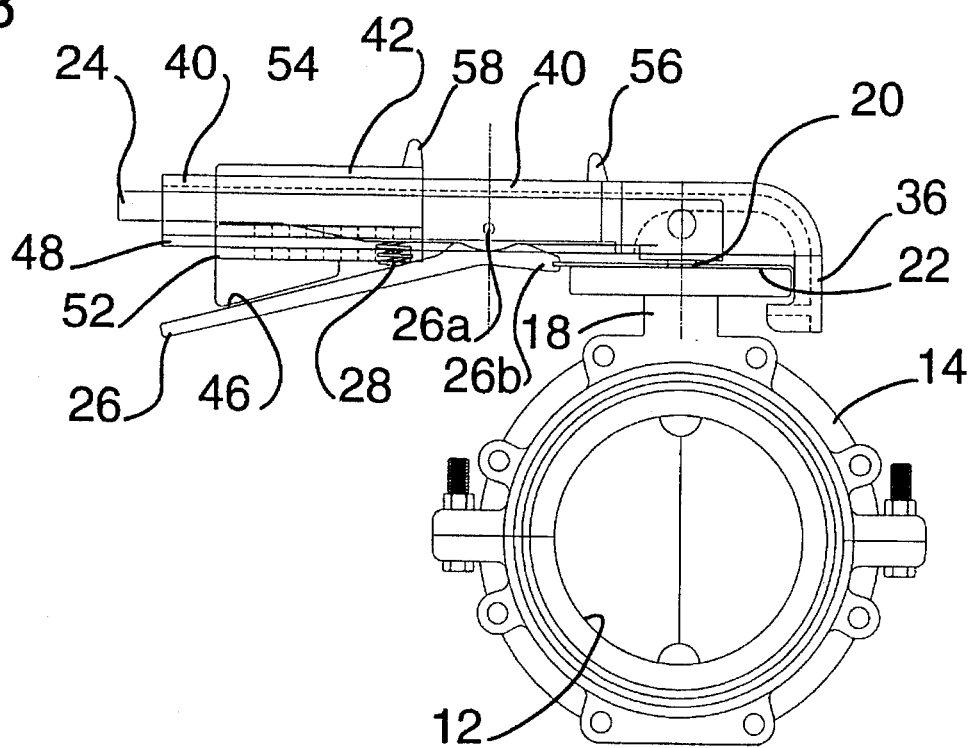
FIG. 8 is a view similar to FIG. 7, but with the present locking device not being in sectional view.

Accordingly with an important feature of the invention, and with further reference to FIG. 9 of the drawings, the U-section 38 of male locking part 32 includes a transverse flange 48 having a number of lengthwisely spaced bores 50 therealong. Moreover, passageway 44 of female part 34 includes a transverse extension or pocket, 52, sized for through engagement by flange 48, and including a number of bores 54, adapted to come in register with the bores 50 of flange 48.

Preferably, the wall of male part 38 opposite channel 40 carries an integral shoulder 56, proximate end part 36, and the wall of female part 34 opposite wedge part 46 carries a similar shoulder 58. Shoulders 56 and 58 constitute tabs that facilitating individual handling of the separate components 32 and 34.

When the male and female members 32, 34, are partially engaged into one another, at least some of the bores 50 from the male member flange 48 transversely registers with corresponding bores 54 from the female member pocket 52. Then, the shackles of a corresponding number of padlocks 60 (FIG. 1) may freely engage such pairs of registering bores of male member flange and female member pocket, to interlock the male and female members 32, 34, while concurrently biasing the wedge block 46 in between diverging lever 26 and handle 24 wherein the lever distal end portion cannot be pivoted upwardly toward handle 24 wherein the level proximate tip 26b will not be able to release the selected notch 22a of the valve handle discoid plate 22.

I claim:

1. A safety lock device for use in releasably locking the head of a butterfly valve in a fluid flow conduit, this valve head of the type having a radial shaft rotatably mounted into a fixed radial tubular extension, a notched discoid plate supported by the fixed tubular extension, a handle transversely carried by the rotatable shaft with an elbowed lever intermediately pivoted to the handle, the lever and handle having distal end portions being divergent in an operative lever condition; wherein said safety lock device comprises:

(a) an elongated male member, having an elongated channel part at one end and a hooking part at the opposite end, said hooking part for releasable hooking engagement with the valve head discoid plate for mounting said male member to the valve head, said elongated channel part being sized for full engagement by the valve handle;

(b) a female member, having a casing part with a mouth, sized for through engagement by said channel part, and a wedge part, integrally depending from said casing part and sized for frictional engagement between the diverging distal end portions of the valve handle and lever; and (c) locking means, for releasably interlocking said male and female members when said male member channel part is engaged into said female member casing part, and for concurrently locking the diverging valve lever by preventing release of said wedge part from between the valve handle and valve lever.

2. A safety lock device for butterfly valve as defined in claim 1, wherein said locking means includes means preventing a single operator from singlehandedly unlocking same.

3. A safety lock device for butterfly valve as defined in claim 1, wherein said locking means includes:

(a) an elongated flange, transversely carried by said channel part, said flange having at least one bore;

(b) a casing extension, transversely depending from said casing part and defining an open pocket, sized for axial engagement by said flange, and at least one bore complementary to said at least one flange bore; and (c) at least one padlock member, having a shackle releasably engaging a selected pair of one said flange bore and of one said pocket bore.

4. A safety lock device for butterfly valve as defined in claim 3, wherein each of said casing extension and of said channel flange includes at least a few said bores, and further including additional padlock members, engaging additional selected pairs of said flange bores and said pocket bores, wherein a multiple padlock safety lock system is obtained.

5. A safety lock device for butterfly valve as defined in claim 1, further including first and second complementary shoulders, integrally carried by said channel part and by said casing, respectively, for facilitating separate handling of said male and female members.

6. A safety lock device for butterfly valve as defined in claim 1, wherein said channel part is cross-sectionally U-shape.

7. A locking device for use with an elongated butterfly valve assembly of the type being mounted radially of a fluid flow conduit, the valve assembly including a transverse control handle for pivotal rotation between a first position, parallel to and in register with the conduit, and a second position, transverse to the conduit; this valve assembly further including an elbowed lever, being pivoted to the control handle at intermediate portions thereof, and a notched plate, wherein a proximate end tip of the elbowed lever is engageable into a selected notch of the multiple notches plate and wherein a distal end part of the elbowed lever is manually actuatable to release the lever distal end part from the selected notch of the notched plate; wherein said locking device consists of:

(a) a male member, defining an elongated main body for releasably engaging over a substantial portion of said control handle lengthwisely thereof;

(b) a female member, defining an elongated pocket member, said pocket member having a mouth at one end, the releasably interengaged said male member and said control handle to be releasably engaged through said mouth into said pocket member for interlocking said male member and said handle, wherein said handle becomes generally concealed by said male and female members;

(c) means for preventing relative movement of said male member about said fluid conduit;

(d) means for releasably anchoring said male and female members exclusively of said handle lever; and (e) a wedge member, integrally carried by said pocket member, for wedging engagement between the control handle and pivotal lever in relatively divergent conditions thereof to prevent pivotal displacement of said pivotal lever toward said control handle; wherein said locking device prevents unauthorized pivotal rotation of said handle lever.

8. A safety lock for butterfly valve as defined in claim 7, wherein said anchoring means includes:

a flange, edgewisely depending from said male member and defining a number of lengthwisely spaced first bores;

a cross-sectionally U-shape rail, integrally dependent from one side edge of said female member and releasably engaged axially by said flange, and defining a number of lengthwise spaced second bores; and at least two padlocks, each having a shackle releasably engaging a registering pair of said first bore and second bore for multiple interlock between said flange and said rail.

* * * * *